A. WOUDEMA.
POULTRY FUMIGATOR.
APPLICATION FILED JULY 10, 1919.
1,335,629. Patented Mar. 30, 1920.
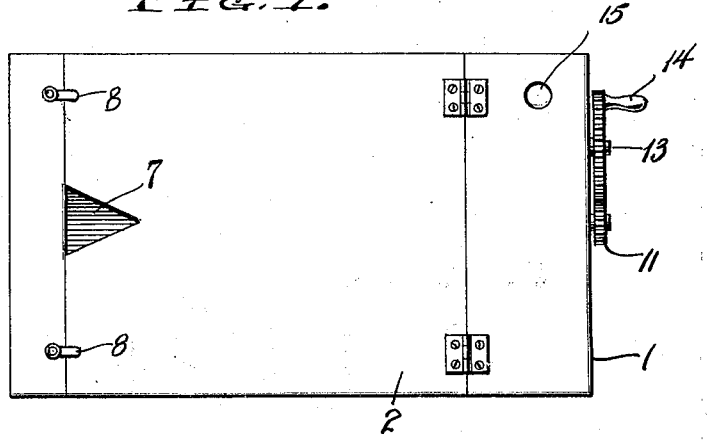
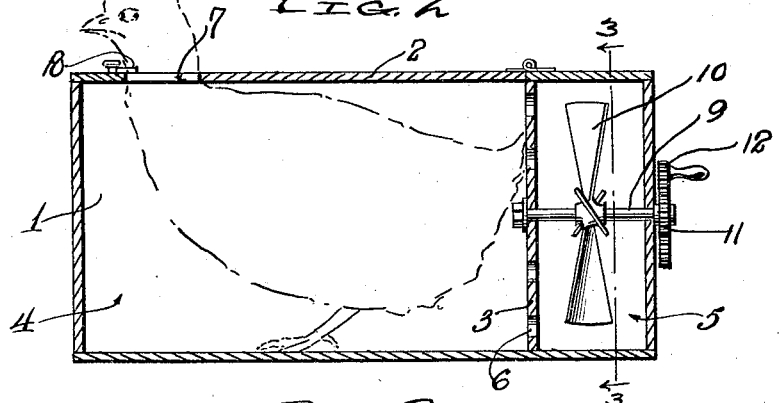
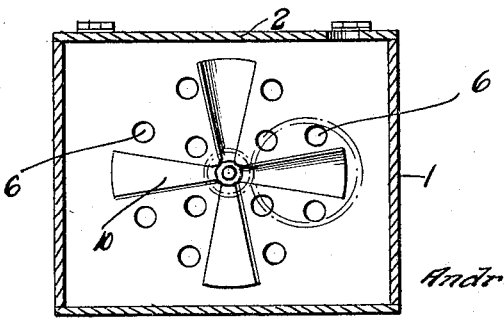
Inventor
Andrew Woudema

UNITED STATES PATENT OFFICE.

ANDREW WOUDEMA, OF DEMOTTE, INDIANA, ASSIGNOR OF ONE-HALF TO DICK DE YOUNG, OF DEMOTTE, INDIANA.

POULTRY-FUMIGATOR.

1,335,629.

Specification of Letters Patent.

Patented Mar. 30, 1920.

Application filed July 10, 1919. Serial No. 309,829.

*To all whom it may concern:*

Be it known that I, ANDREW WOUDEMA, a citizen of the United States, residing at Demotte, in the county of Jasper and State of Indiana, have invented certain new and useful Improvements in Poultry-Fumigators, of which the following is a specification.

This invention relates to fumigating apparatus and more particularly to a machine especially adapted for fumigating poultry and for destroying vermin on the bodies of poultry and fowl by applying an insecticide in such a manner as to insure its permeating the body feathers of the fowl so as to attain the desired results in a thorough and effective manner.

The invention further aims at the provision of a machine which will be hand operated to create a blast of air which will ruffle the body feathers of the fowl and cause the insecticide to thoroughly permeate the same.

The above and additional objects are accomplished by such means as are illustrated in the preferred embodiment and in the accompanying drawings, wherein like characters denote like or corresponding parts throughout the several views, in which:—

Figure 1 is a plan view of the device constructed in accordance with my invention, Fig. 2 is a longitudinal section through the same, and Fig. 3 is a section taken on the line 3—3 of Fig. 2.

Referring to the drawings, wherein is illustrated the preferred form of my invention, the box comprises a substantially rectangular container, which has a top hinged cover 2 and is provided with a partition 3 near one end thereof for separating the container into a front compartment 4 and a fan compartment 5. The partition 3 is provided with a plurality of small openings 6 whereby the wind from the fan in the compartment 5 may be directed into the main compartment 4. The fowl indicated by dotted lines in Fig. 2 is adapted to stand in the main compartment and the top hinged cover 2 is provided with an opening 7 through which the fowl's head may extend. The clips 8 are employed to maintain the cover in closed position during the time the machine is in use. Journaled in the partition and in one of the end walls is an operating shaft 9 which carries a fan 10 centrally located in the compartment 5. The rear end of the shaft 9 extends beyond the end wall of the container and is equipped with a pinion 11 in mesh with a gear 12 on a stud shaft 13 attached to the end of the container. The gear 12 is provided near its edge with a handle 14 whereby the larger gear may be rotated to impart movement to the pinion whereby the fan shaft may be actuated to turn the fan. The top of the container above the compartment 5 is provided with an opening 15 through which insect powder or any other suitable insecticide may be dropped into the fan compartment so that when the fan is in actuation the blast of air will be forced through the opening 6 and the insecticide will be carried with the wind from the fan into the main compartment 4 and since the wind from the fan will ruffle the body feathers of the fowl it will be obvious that the insecticide will thoroughly permeate the body of the fowl and without discomfort to the fowl. By virtue of the position of the cover 2 and the opening 7 it will be readily apparent that the fowl need not be lifted from the compartment but will readily jump from the container itself by simply forcing the cover 2 upwardly when the operator releases the clip 8.

The foregoing description and accompanying drawings have reference to what might be considered to be the approved or preferred form of my invention. I desire it to be understood that I may make such changes in the construction, combination and arrangement of parts, materials, dimensions, et cetera, as may prove expedient and fall within the scope of the appended claim.

Having thus fully described my invention what I claim as new and desire to secure by Letters Patent, is:—

A poultry fumigator including a casing equipped with a foraminous partition to divide the latter into two compartments, one of which receives the fowl and has an opening therein through which the head of the fowl may extend, the other compartment having an opening for the introduction of an insecticide, and a fan mounted in said
5 second compartment to create an air blast for forcing the insecticide through the partition and onto the fowl.

In testimony whereof I affix my signature in presence of two witnesses.

ANDREW WOUDEMA.

Witnesses:
    JOHN WOUDEMA,
    DICK DE YOUNG.